United States Patent
Xia et al.

(10) Patent No.: US 8,584,062 B2
(45) Date of Patent: Nov. 12, 2013

(54) TOOL SUITE FOR RTL-LEVEL RECONFIGURATION AND REPARTITIONING

(75) Inventors: Liang Xia, Austin, TX (US); Mario A. Maldonado, Jr., San Antonio, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/282,917

(22) Filed: Oct. 27, 2011

(65) Prior Publication Data

US 2013/0111423 A1    May 2, 2013

(51) Int. Cl.
*G06F 17/50* (2006.01)
(52) U.S. Cl.
USPC ........... 716/103; 716/101; 716/104; 716/105; 716/106; 716/107
(58) Field of Classification Search
USPC ................. 716/101, 103, 104, 105, 106, 107
See application file for complete search history.

(56) References Cited

U.S. PATENT DOCUMENTS

| | | | |
|---|---|---|---|
| 5,761,079 A | 6/1998 | Drumm | |
| 6,336,087 B2* | 1/2002 | Burgun et al. | 703/15 |
| 6,836,877 B1* | 12/2004 | Dupenloup | 716/103 |
| 7,080,344 B2 | 7/2006 | Bajuk | |
| 7,143,367 B2* | 11/2006 | Eng | 716/102 |
| 7,441,210 B2* | 10/2008 | Lahner et al. | 716/104 |
| 7,480,606 B2* | 1/2009 | Tseng et al. | 703/14 |
| 7,584,460 B2 | 9/2009 | Broberg | |
| 7,694,241 B1* | 4/2010 | Jadcherla et al. | 716/127 |
| 8,266,571 B2* | 9/2012 | Chapman et al. | 716/136 |
| 2001/0011212 A1* | 8/2001 | Raynaud et al. | 703/22 |
| 2005/0268258 A1* | 12/2005 | Decker | 716/4 |
| 2006/0117274 A1* | 6/2006 | Tseng et al. | 716/1 |
| 2009/0132979 A1* | 5/2009 | Waters et al. | 716/5 |
| 2011/0113392 A1* | 5/2011 | Chakraborty et al. | 716/102 |
| 2011/0154062 A1* | 6/2011 | Whelihan et al. | 713/193 |
| 2012/0017185 A1 | 1/2012 | Padmanabhan | |

OTHER PUBLICATIONS

U.S. Appl. No. 13/283,665 entitled "Logical Repartitioning in Design Compiler", filed Oct. 28, 2011.

* cited by examiner

*Primary Examiner* — Helen Rossoshek
(74) *Attorney, Agent, or Firm* — Anthony M. Petro; Meyertons, Hood, Kivlin, Kowert & Goetzel, P.C.

(57) ABSTRACT

A novel set of reconfiguration tools combine the RTL (Register Transfer Language) construct detection of synthesis compilers with a more advanced implementation of expansion syntax. HDL (Hardware Description Language) coding constructs are automatically detected and recoded and/or modified, for both behavioral and structural HDL code. Configuration file(s) may be used to define the transformations, and transformation commands within the configuration file(s) may define where and how to apply RTL changes. The tool may automatically identify sections of code as the file is parsed (e.g. like a compiler). The transformations are written out in RTL, and the resulting reconfigured RTL file(s) may be processed by a synthesis tool, or may be simulated using a suitable simulator. This allows for automated detection and configurable modification of HDL-coding constructs. Design changes may therefore be verified earlier in the design process, since changes are embedded in RTL, instead of being embedded in the netlist.

14 Claims, 7 Drawing Sheets

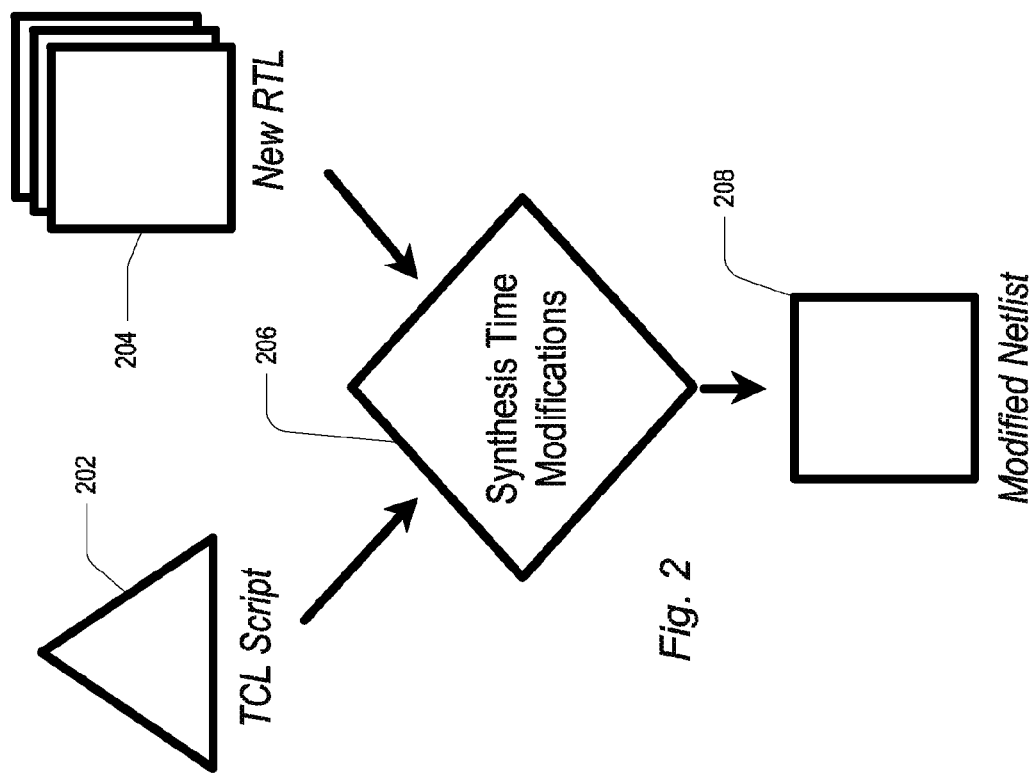
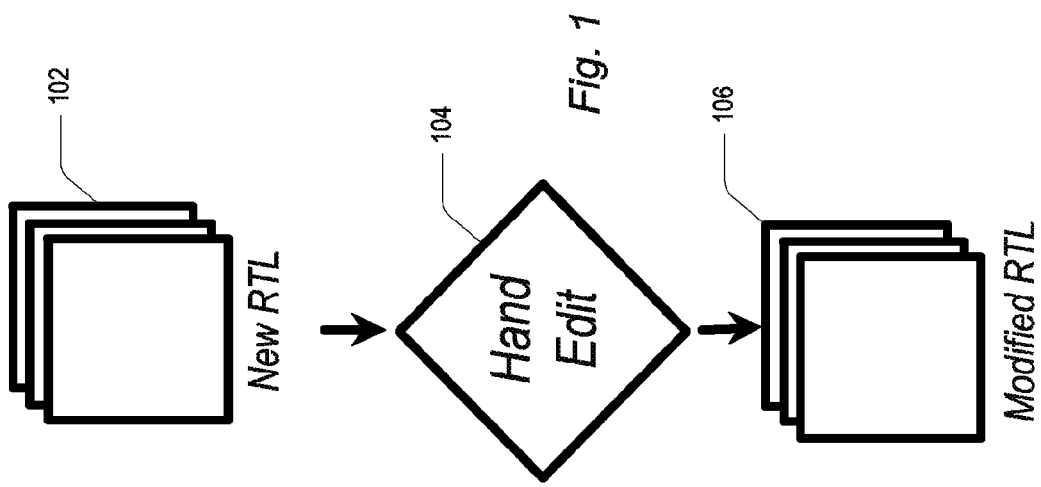

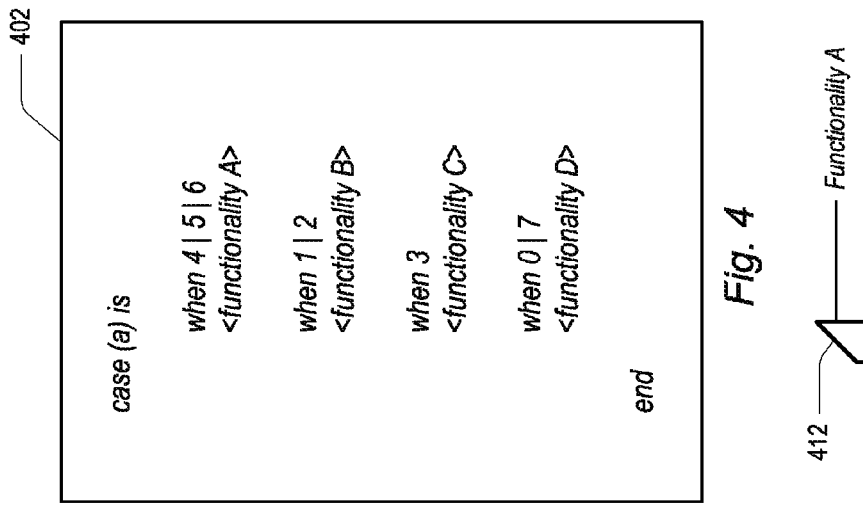
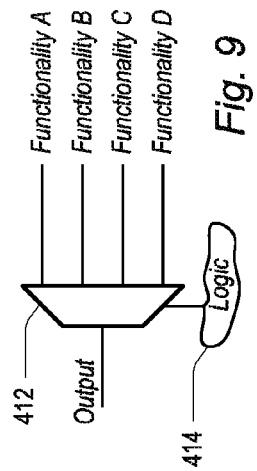
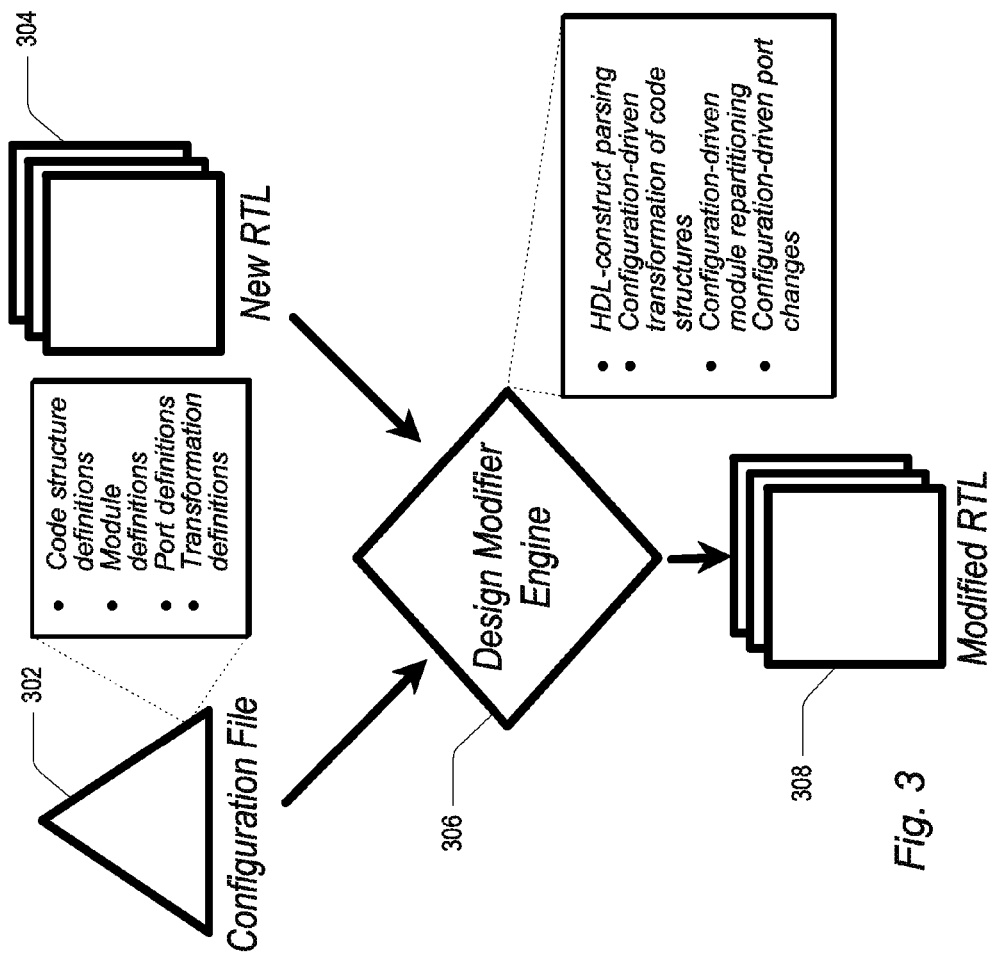

```
case a_tmp is
    when 0
        <functionality A>
    when 1
        <functionality B>
    when 2
        <functionality C>
    when 3
        <functionality D>
end
```
— 502

```
case (a) is
    when 4|5|6 =>
        a_tmp <= 0
    when 1|2 =>
        a_tmp <= 1
    when 3 =>
        a_tmp <= 2
    when 0|7 =>
        a_tmp <= 3
end
```
— 602

TOOL SUITE FOR RTL-LEVEL RECONFIGURATION AND REPARTITIONING

BACKGROUND

1. Technical Field

This disclosure relates to integrated circuit design, and more particularly to a method for reconfiguring and modifying register transfer language code base.

2. Description of the Related Art

Integrated circuit design flow is a complex process. Most often, a functional/behavioral description of the system/circuit is created with use of a register transfer language (RTL) or hardware description language (HDL) such as Verilog or VHDL (Very high speed integrated circuits Hardware Description Language). An important part of the design process is the creation of a logic implementation, and subsequently a transistor level implementation of these behavioral models. The creation of these implementations is oftentimes automated through the use "synthesis" tools. Generally, a synthesis program is used to generate a netlist from the HDL models, making use of standard cell libraries containing a variety of circuit elements from which the integrated circuit may be constructed. Netlists usually include instances of the standard cells contained in the design, with the possible inclusion of custom blocks, and information descriptive of the connectivity between all the instances included in the integrated circuit. There are different types of netlists that can be used, including physical and logical netlists, instance-based and net-based netlists, and flat and hierarchical netlists. Typically, the final netlist generated by the synthesis tool is dependent on the constructs that appear in the HDL model. In other words, the style and syntax of various functional elements in the HDL oftentimes determines the type of elements and components that appear in the netlist generated by the synthesis tool.

Because the design cycle for integrated circuits is complex and there are many steps, integrated circuits may oftentimes include circuit blocks that are exchanged between designers and design engineers as completed blocks. Part of this process includes one group of engineers, e.g. working for Intellectual Property (IP) vendors, delivering RTL code bases representative of a given design to another group of engineers. However, RTL code bases tend to change over time as the IP vendors deliver RTL drops. When such drops occur, prior RTL edits for performance improvements need to be maintained. In other words, an RTL code base delivered by an IP vendor might be modified and improved by the engineers receiving the RTL code. However, subsequent RTL drops of updated versions of the same given design by the IP vendor will be missing the modifications and improvements that have been made for previous versions, as any such modifications and improvements will be the IP of the receiving engineering team. However, it is obviously desirable for the receiving engineering team to port the improvements from the previous version to the current version of the RTL code base. Existing techniques for dealing with this task involve reliance on manual merging/editing of code or reliance on synthesis time modifications, which tend to be inefficient and error-prone.

SUMMARY OF THE INVENTION

A novel set of tools allows for the automated reconfiguration of RTL code, as well as the automated merging of edits that could not be easily handled via automated reconfiguration before. The novel set of tools combine the RTL construct detection of synthesis compilers (the parser) with a more advanced implementation of expansion syntax (the transformations). HDL coding constructs are automatically detected and recoded and/or modified. This may be performed for both behavioral and structural HDL code. Configuration files may be used to define the transformations, and transformation commands may define where and how to apply RTL changes. A design modifier engine may automatically identify sections of code as the file is parsed (e.g. like a compiler), and write out the transformations in RTL that may then be processed by a synthesis tool, or may be simulated using a suitable simulator. This allows for automated detection and configurable modification of HDL-coding constructs. Furthermore, design changes may be verified earlier in the design process, since changes are embedded in RTL, instead of being embedded in the netlist.

BRIEF DESCRIPTION OF THE DRAWINGS

FIG. 1 shows a design flow diagram illustrating the process of applying specified improvements/edits to a new RTL code base by hand editing the new RTL code base.

FIG. 2 shows a design flow diagram illustrating the process of applying specified improvements/edits to a new RTL code base during synthesis.

FIG. 3 shows a design flow diagram illustrating an improved and automated process of applying improvements/edits to a new RTL code base to produce a functionally equivalent modified RTL code base.

FIG. 4 shows exemplary RTL code, which may be interpreted as a representation of a multiplexer.

FIG. 9 is a block diagram of a logical equivalent of the code segment shown in FIG. 4 interpreted as a multiplexer.

Figures 5, 6, 10:
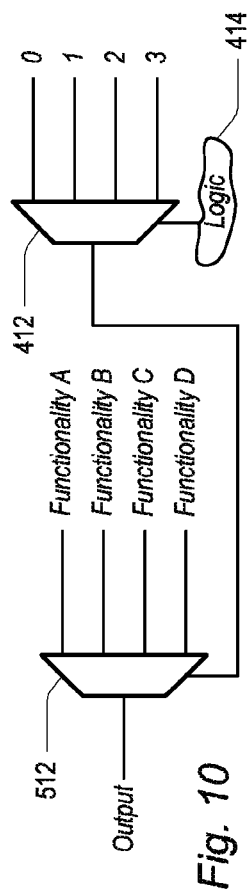
FIG. 5 shows exemplary additional RTL code written based on the overall structure of the RTL code shown in FIG. 4.
FIG. 6 shows exemplary reconfigured RTL code written based on the overall structure of the RTL code shown in FIG. 4 and the RTL code shown in FIG. 5.
FIG. 10 is a block diagram of a logical equivalent of the code segments shown in FIG. 5 and FIG. 6 interpreted as a multiplexer structure.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

As previously mentioned, the complexity and scope of the design cycle for integrated circuits may sometimes result in the exchange of certain completed circuit blocks or completed Intellectual Property (IP) blocks between different groups of designers or design engineers. The exchange oftentimes consists of IP vendors delivering Register Transfer Language (RTL) code bases representative of a given circuit block to a group of engineers who may use the given circuit block as the basis or part of a larger design. Consequently, further improvements and/or changes to the RTL code by the IP vendor may take place concurrently with the development of the larger design by the receiving engineers. As a result, each subsequent drop of an updated RTL code base has to be modified by the receiving engineers to maintain prior RTL edits that were made for performance improvements. To put it another way, since the RTL code base delivered by the IP vendor is modified and improved by the receiving engineers simultaneously with the IP vendor independently producing a next version of the RTL code base, subsequent RTL drops of updated versions of the same given circuit block by the IP vendor will be missing the modifications and improvements that have been made for previous versions by the receiving engineers.

Traditionally, the receiving engineering team has ported the improvements from the previous version of the RTL code base to the current version of the RTL code base by either performing hand edits on the each RTL code base revision, or making the modifications in the netlist (e.g. during synthesis) instead of within the RTL code itself. That is, existing techniques for dealing with porting the improvements from previous versions of RTL code base to current versions of the RTL code base involve reliance on manual merging/editing of code, or reliance on synthesis time modifications. FIG. 1 shows a design flow diagram illustrating the process of applying (previously specified) improvements/edits to a new RTL code base by hand editing the new RTL code base. The new RTL code base computer file (102) may be hand edited by the engineers (104), for example by using a text editor program, resulting in the modified RTL file (106). The newly created RTL code base may then be used to synthesize the desired netlist. The design flow in FIG. 1 is time consuming, and typically error prone.

FIG. 2 shows a design flow diagram illustrating the process of applying improvements/edits to a new RTL code base during synthesis. A new RTL code base file (204) may be used as the input file to the synthesis tool. A script, e.g. a TCL (Tool Command Language) script (202) may include modifications to be implemented during the synthesis process (206), to produce the desired modified netlist (208). The netlist is a modified netlist in the sense that it is different from the netlist that would have been generated by the synthesis tool without the TCL file (202) input. One disadvantage of the design flow shown in FIG. 2 is that the modifications are only visible post-synthesis, which may lead to an undesirably large number of iterations required to obtain the desired improvements. It may also result in capacity issues with formal verification tools.

FIG. 3 shows a design flow diagram illustrating an improved process of applying improvements/edits to a new RTL code base, in which the modifications are actually performed in the RTL code base, but not through a manual editing process. Overall, as part of the design flow shown in FIG. 3, HDL coding constructs may be automatically detected and recoded/modified, as executed on a computing platform, for example. The automatic detection and recoding/modifying may be performed on behavioral and/or structural HDL code, depending on the desired result. A configuration file (302) may be used to define the transformations (i.e. the recoding/modifying). The configuration file may be provided along with the new RTL code base (304) to a design modifier engine (DME —306), which may execute the transformations according to the contents of the configuration file. The process results in a modified RTL code base (308) that includes all desired modifications and improvements.

In one set of embodiments, the configuration file (302) may include a description and listing of RTL constructs that are to be identified by the DME. The configuration file may further include the definition of the transformations that are to be applied to the various respective constructs identified within the new RTL code base. In general, the transformation commands may define where and how to apply RTL changes. The DME 206 may automatically identify sections of code (specified in the configuration file) as it parses the RTL code base file, similar to how a compiler may parse source code, and apply the transformations as instructed in the configuration file. The transformations may be written out into the RTL output file (308) that may then be processed by synthesis or by a simulator. HDL-coding constructs may therefore be detected and modified in a configurable, automated manner, by combining the RTL construct detection of synthesis compilers with a more advanced implementation of expansion syntax.

Thus, in the embodiment shown in FIG. 3, configuration file 302 includes definitions for code structure, modules, ports, and transformations. Configuration file 302 and the new (to be modified) RTL code base are provided to DME 206, which performs HDL-construct parsing, configuration-driven transformation of code structures, configuration-driven module repartitioning, and configuration-driven port changes. In other words, DME 306 parses the RTL code base to identify the code structures of interest as defined in the configuration file 302, and transform the identified code structures according to the transformation definitions and definitions of modules and ports as they appear in the configuration file 302. The modified RTL file now contains the whole functionality of the new RTL code base in addition to the desired improvements and modifications to the RTL code.

In performing the transformations, it may be commonly desired is to preserve certain RTL structures. For example, if a preferred multiplexer structure has been defined/obtained, it may be desirable to preserve that multiplexer structure. This might allow minimizing the number of pins, and/or reduce congestion in the netlist. For example, breaking a large/sizeable multiplexer, e.g. a 4-1 multiplexer, into multiple gates, e.g. 5 or 6 gates, may result in excess gates and pins that need to be managed, itself potentially resulting in congestion. FIG. 4 shows an exemplary RTL code 402, which may be interpreted as a representation of one embodiment of a multiplexer. More specifically, if code 402 is provided to a synthesis tool, the synthesis tool interprets/identifies the construct as a 4-1 multiplexer. For example, the first definition of the case statement includes "when 4|5|6<functionality A>", meaning, if the value of 'a' is either 4 or 5 or 6, 'functionality A' is implemented/active. However, when logical components, such as the logical 'OR' function in '4|5|6' are encountered by the synthesis tool, it may not recognize the construct as a multiplexer, even though the structure clearly implies a multiplexer structure.

In synthesizing the RTL code 402, a multiplexer structure may be preferred over a "flattened" AOI (AND-OR-Invert) gate structure due to the considerably fewer number of connections (i.e. lines or wires) required for implementation, reducing routing congestion issues. (It is noted that AOI logic and AOI gates are two-level compound, or complex, logic functions constructed from the combination of one or more AND gates followed by a NOR gate.) However, it may be difficult to induce the synthesis tool to interpret the code 402 properly, requiring changes to the RTL code 402. Manual recode, as previously noted, is difficult, especially when the multiplexer changes (e.g. becomes a 5-1 multiplexer, etc.) In all cases, each new RTL code base would require a manual rewrite.

However, based on the overall structure of RTL code 403, RTL code 502 may be generated/written, as shown in FIG. 5. As seen in code 502 in FIG. 5, the respective logic conditions (four in all) contained in code segment 402 have been replaced with corresponding numeric values (also four in all). Accordingly, the functionality for each respective value of 'a_tmp' in code segment 502 matches the functionality for each corresponding logic condition listed in code segment 402. For example, in case statement 502, functionality A (or function A) is true when the value of a_tmp is '0', which represents the same functionality in case statement 402 when the value of 'a' is '4|5|6' (i.e. 4 or 5 or 6) as written in code segment 402. Code segment 502 may be readily recognized by synthesis as a multiplexer, requiring only a few gates to implement in the netlist. Then, since code segment 502 has been generated, RTL code segment 402 may be re-written/ transformed as code segment 602. Furthermore, since code segment 502 encompasses the full corresponding functionality included in the condition statements in code segment 402, wherever code segment 402 appears in the RTL code base file, it may be transformed to code segment 602.

FIG. 9 provides a block diagram illustration of code segment 402 interpreted as a multiplexer 412. Logic 414 represents the conditional statements, providing the appropriate select value to multiplexer 412 for given values of 'a' within logic 414. As previously mentioned, synthesis might not produce a netlist that includes multiplexer 412 as the element corresponding to code segment 402, but may instead generate an AOI structure, e.g. due to the combination of logical condition statements and associated functionality within code segment 402. Since the goal is to control what is generated by the synthesis tool, code segment 502 includes no logical condition statements, and code segment 602 contains a simple assignment statement in lieu of the 'functionality' that appears in code segment 402. In other words, when parsing the RTL code base that includes code segment 402, DME 306 may interpret "4|5|6" as '0', "1|2" as '1', etc., and transform code segment 402 to become code segment 602. Additionally, DEM 306 may generate code segment 502, to maintain the proper associated functionality as originally included in code segment 402 in the RTL code base. The synthesis tool may then produce the multiplexer structure shown in FIG. 10 to correspond to code segment 602 in the netlist generated from the modified RTL file 308.

As seen in FIG. 10, multiplexer 412 may now simply select a corresponding (associated) value for each true condition statement, with the output serving as the select value for multiplexer 512, generating the final Output. Multiplexer 412 thus represents code segment 602, and multiplexer 512 represents code segment 502. To put it another way, the combination of code segments 502 and 602 may result in the multiplexer structure of FIG. 10 generated in the netlist produced by the synthesis tool when synthesizing the reconfigured RTL code. It should also be noted, that such reconfiguration may also represent an effective repartitioning of the RTL code base, including port changes, resulting from the transformation of the code structures. Furthermore, it is reasonable to assume at this stage that the synthesis tool properly optimizes the corresponding final multiplexer structure generated in the netlist.

The definitions in configuration file 302 may take the form of configuration commands to be executed by DME 306. In one set of embodiments, the configuration commands may include:

SETUP COMMANDS; e.g. defining the location of RTL code

CODE STRUCTURE EDIT COMMANDS; e.g. identification and conversion of code structures PORT INTERFACE EDIT COMMANDS; e.g. adding and removing ports MODULE EDIT COMMANDS; e.g. merging modules, splitting modules ASSIGNMENT EDIT COMMANDS; e.g. creating a new signal assignment CODE COMMENT COMMANDS; e.g. adding code comments, commenting out code VERBATIM COMMANDS; e.g. editing lines that match a regular expression.

It should also be noted that the RTL 'case' code structure as corresponding to multiplexers being synthesized in the netlist is provided herein as an example, and DME 306 operating according to configuration file 302 may perform various desired transformations on other code structures and code segments as desired. As also previously mentioned, in one sense the transformations may be motivated by a desire to obtain certain specified synthesized structures in the netlist based on the RTL code base. Thus, while DME 306 performs transformations on the received RTL code base according to the configuration file 302, the functionality of the RTL code base will not change. In other words, the functionality of the received RTL code base will be identical to the functionality of the modified RTL code base.

Figure 7A:
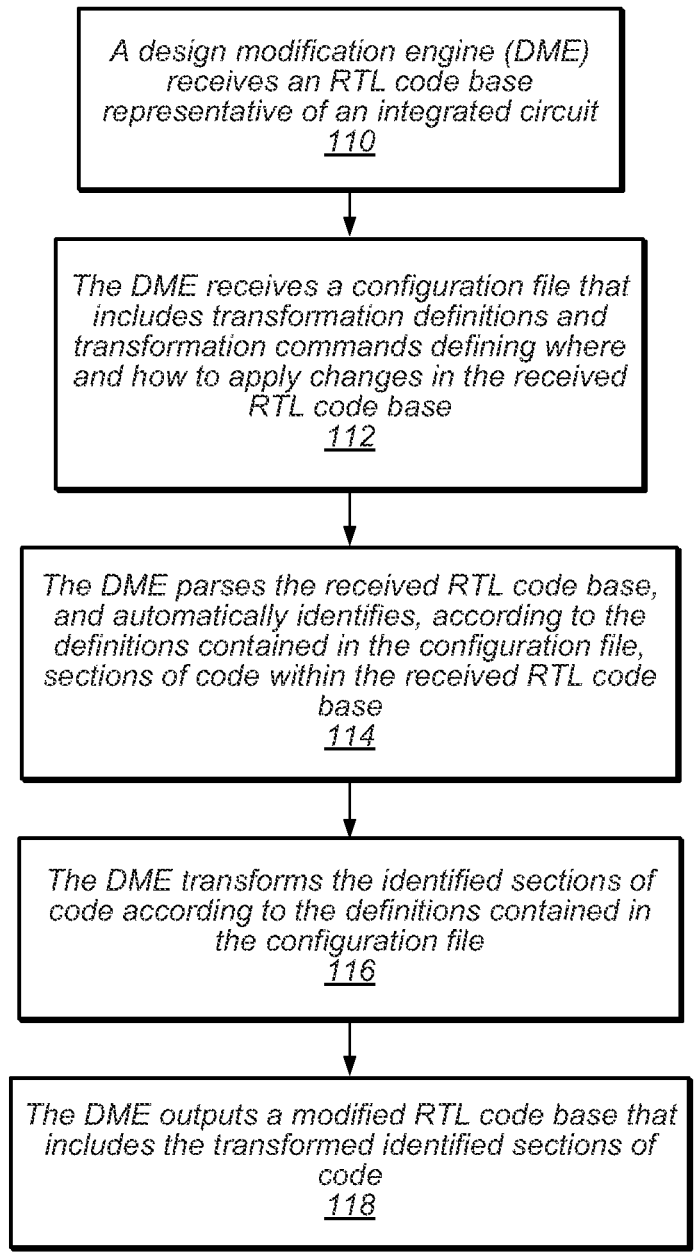
FIG. 7a shows a flow diagram depicting one embodiment of an operational flow for RTL-level reconfiguration and repartitioning of an RTL code base.

FIG. 7a shows a flow diagram depicting one embodiment of an operational flow for RTL-level reconfiguration and repartitioning of an RTL code base. As previously mentioned, a new RTL code base—representative of an integrated circuit, for example—may be provided by one designer, group, or IP vendor, and may be used as part of a larger circuit design. The RTL code base may represent one or more circuit blocks prior to the register (higher) level model having been synthesized. The RTL representation may be written in a hardware description language (HDL) such as Verilog or VHDL, for example.

A design modification engine (DME, e.g. DME 306) may receive the RTL code base representative of an integrated circuit (110). The DME may also receive a configuration file that includes transformation definitions and transformation commands defining where and how to apply changes in the received RTL code base (112). The DME may then parse the received RTL code base, and automatically identify, according to the definitions contained in the configuration file, sections of code within the received RTL code base (114). The DME may transform the identified sections of code according to the definitions contained in the configuration file (116), and output a modified RTL code base that includes the transformed identified sections of code (118), with the modified RTL code base and the received RTL code base both representing identical functionality.

In some embodiments, transforming the identified sections of code (116) may include rewriting the identified sections of code to ensure that the identified sections of code synthesize to desired circuit structures when a synthesis program generates a netlist from the modified RTL code. The desired circuit structures may sometimes represent logic structures at a higher level of organization than AOI (AND-OR-Invert) logic gates. Transforming the identified sections of code (116) may further include repartitioning modules represented by the identified sections of code, and/or adding and/or removing ports represented by the identified sections of code. In one set of embodiments, the modified RTL code base may be subsequently incorporated into a high-level system that includes additional RTL code.

Figure 7B:
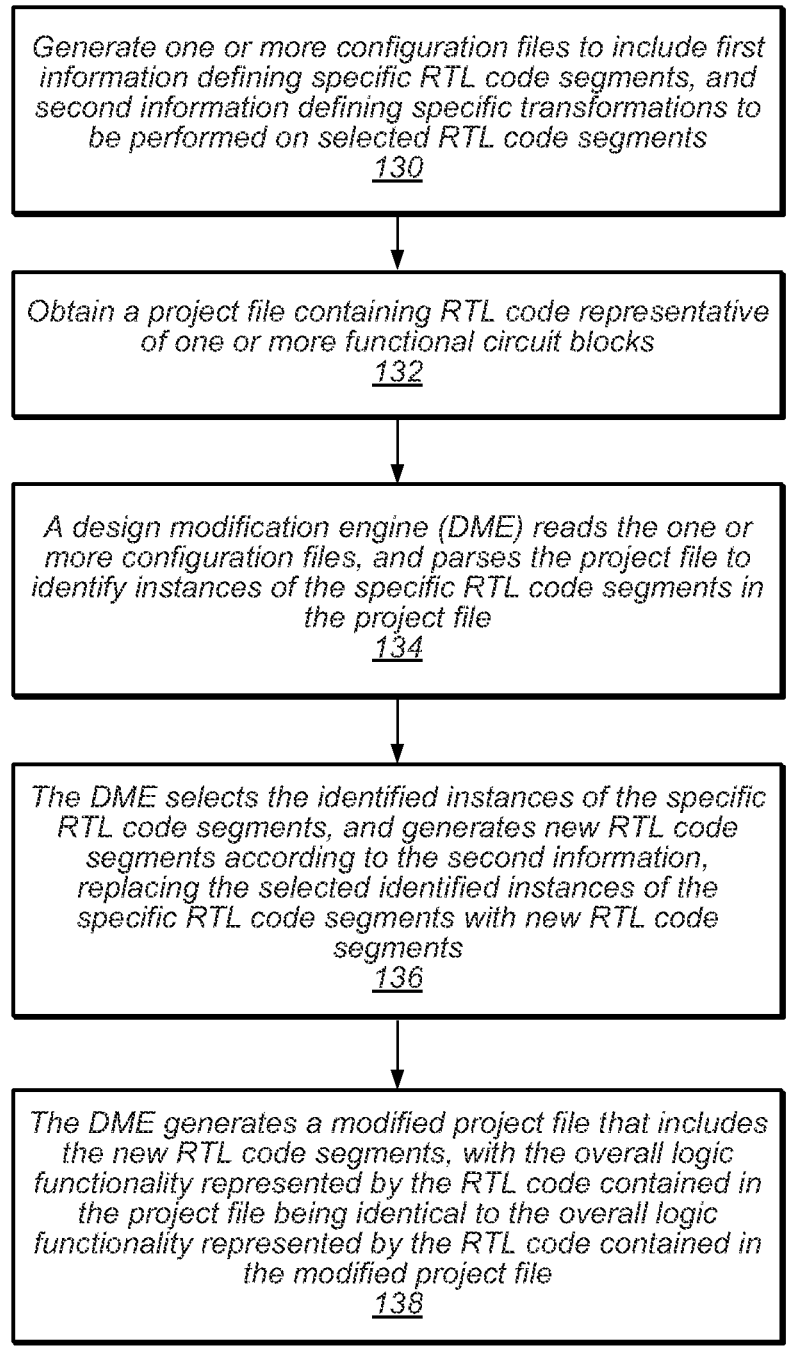
FIG. 7b shows a flow diagram depicting another embodiment of an operational flow for RTL-level reconfiguration and repartitioning of an RTL code base.

FIG. 7b shows a flow diagram depicting another embodiment of an operational flow for RTL-level reconfiguration and repartitioning of an RTL code base. In this embodiment, one or more configuration files are generated to include first information defining specific RTL code segments, and second information defining specific transformations to be performed on selected RTL code segments (130). A project file containing RTL code representative of one or more functional circuit blocks is obtained (132), and a design modification engine (DME) reads the one or more configuration files, and parses the project file to identify instances of the specific RTL code segments in the project file (134). The DME then selects the identified instances of the specific RTL code segments, and generates new RTL code segments according to the second information, replacing the selected identified instances of the specific RTL code segments with new RTL code segments. Finally, the DME generates a modified project file that includes the new RTL code segments, with the overall logic functionality represented by the RTL code contained in the project file being identical to the overall logic functionality represented by the RTL code contained in the modified project file (138).

In some embodiments, the DME may generate the new RTL code segments according to the second information (136) by rewriting the selected identified instances of the specific RTL code segments according to the second information, and/or repartitioning logic modules represented by the identified instances of the specific RTL code segments. In some embodiments, the definitions of the specific transformations may include setup commands, code structure edit commands, port interface edit commands, module edit commands, assignment edit commands, code comment commands, and/or verbatim commands.

In one set of embodiments, additional one or more project files may be obtained. For each additional project file, the DME may parse the additional project file to identify additional instances of the specific RTL code segments in the additional project file according to the first information, select the identified additional instances of the specific RTL code segments, generate additional new RTL code segments according to the second information, and replace the selected identified additional instances of the specific RTL code segments with additional new RTL code segments. Finally, the DME may generate a modified additional project file (corresponding to each additional project file) that includes the additional new RTL code segments, with the overall logic functionality represented by the RTL code contained in the additional project file being identical to the overall logic functionality represented by the RTL code contained in the modified additional project file.

Figure 7C:
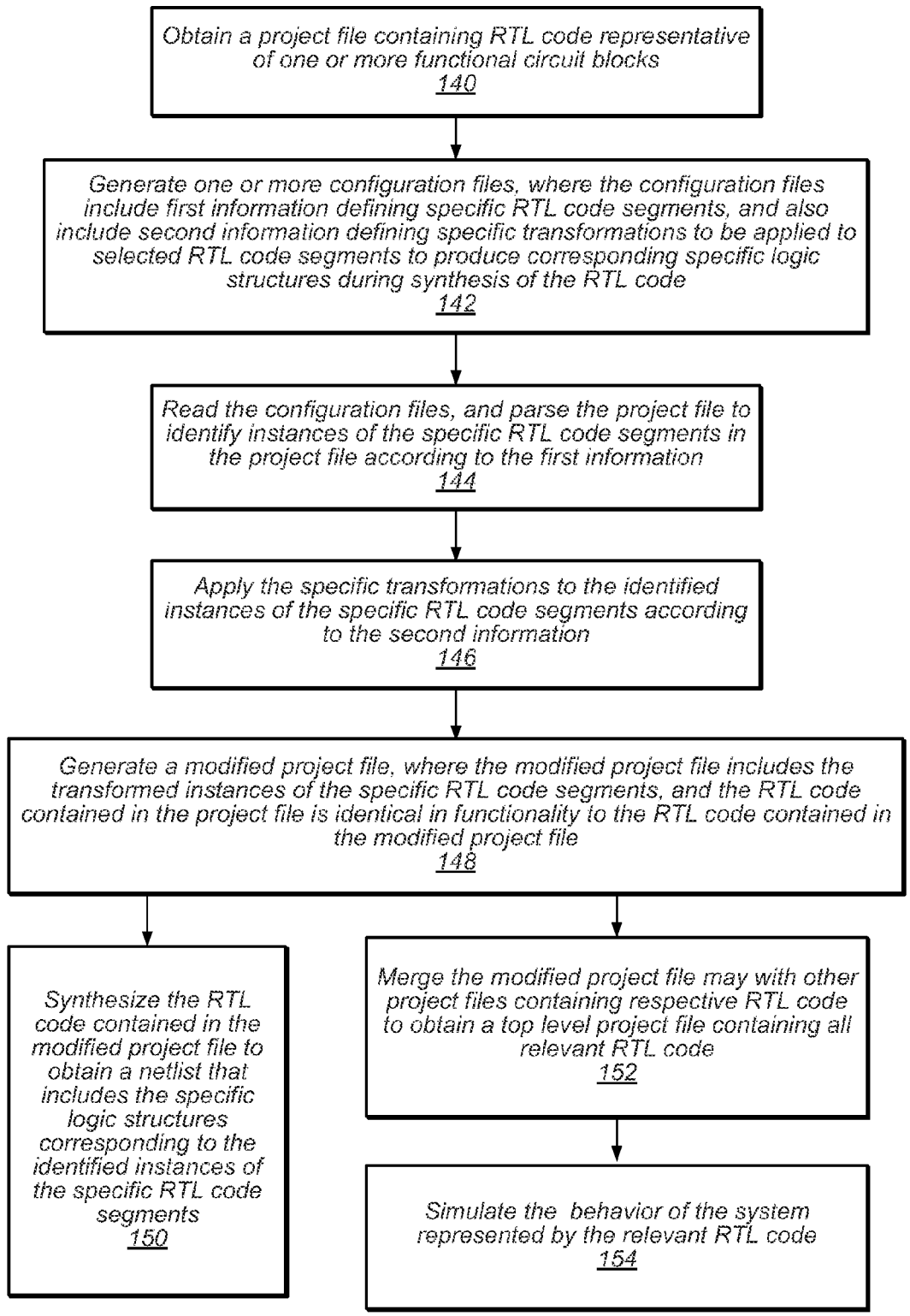
FIG. 7c shows a flow diagram depicting yet another embodiment of an operational flow for RTL-level reconfiguration and repartitioning of an RTL code base.

FIG. 7c shows a flow diagram depicting yet another embodiment of an operational flow for RTL-level reconfiguration and repartitioning of an RTL code base. First, a project file containing RTL code representative of one or more functional circuit blocks is obtained (140). One or more configuration files are generated, where the configuration files include first information defining specific RTL code segments, and also include second information defining specific transformations to be applied to selected RTL code segments to produce corresponding specific logic structures during synthesis of the RTL code (142). The configuration files are then read, and the project file is parsed to identify instances of the specific RTL code segments in the project file according to the first information (144). The specific transformations are applied to the identified instances of the specific RTL code segments according to the second information (146), and a modified project file is generated, where the modified project file includes the transformed instances of the specific RTL code segments, and the RTL code contained in the project file is identical in functionality to the RTL code contained in the modified project file (148). The RTL code contained in the modified project file may then be synthesized to obtain a netlist that includes the specific logic structures corresponding to the identified instances of the specific RTL code segments (150). Alternately, the modified project file may be merged with other project files containing respective RTL code to obtain a top level project file containing all relevant RTL code (152), and the behavior of the system represented by the relevant RTL code may be simulated (154).

Figure 8:
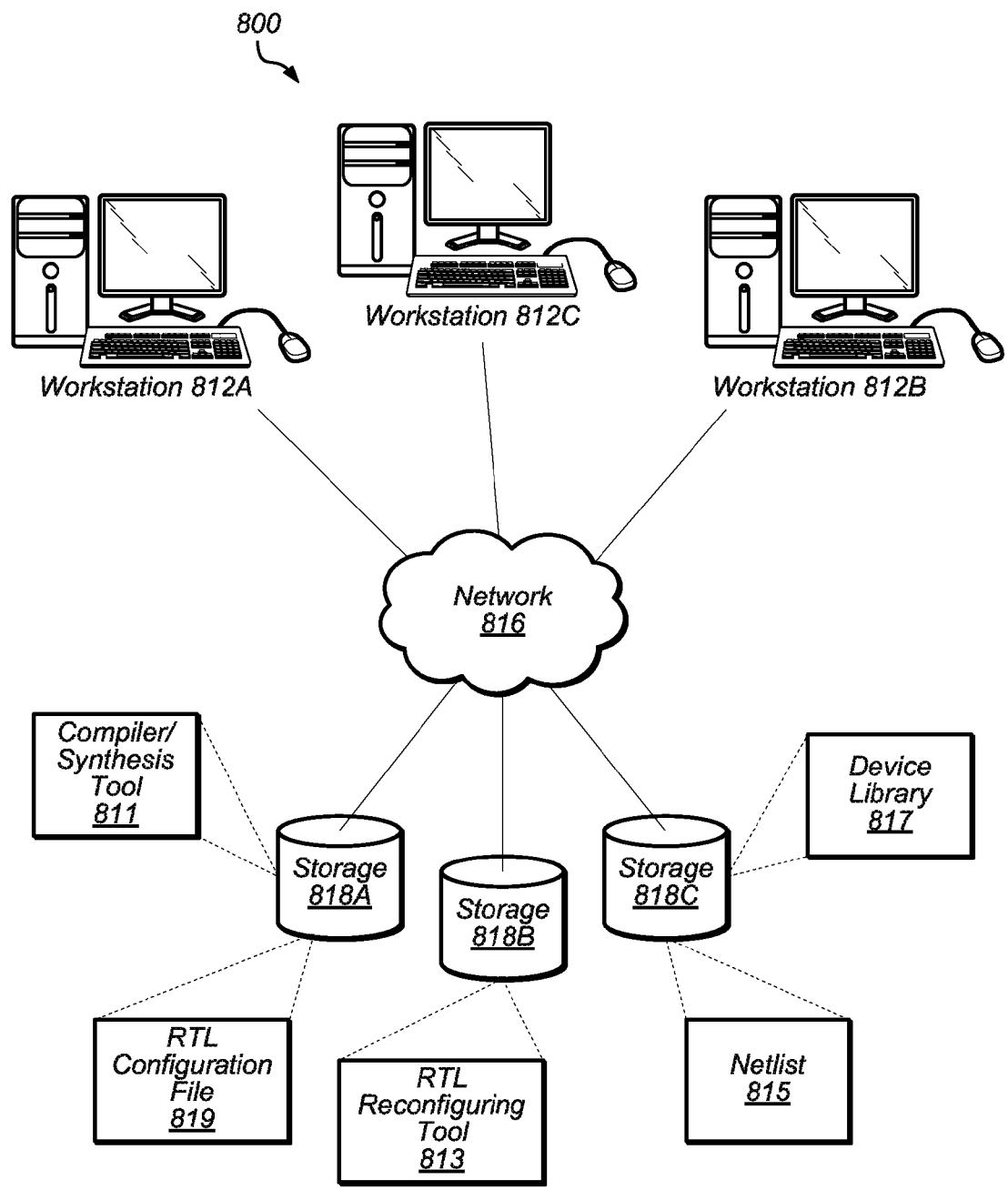
FIG. 8 is a block diagram of one embodiment of a computer system used to implement a design modifier engine for RTL-level reconfiguration.

FIG. 8 shows a block diagram of one embodiment of a computer system used to implement a design modifier engine (DME) for RTL-level repartitioning reconfiguration and repartitioning of an RTL code base. The computer system 800 includes a plurality of workstations designated 812A through 812C. The workstations are coupled together through a network 816 and to a plurality of storages designated 818A through 818C. In one embodiment, each of workstations 812A-812C may be representative of any standalone computing platform that may include, for example, one or more processors, local system memory including any type of random access memory (RAM) device, monitor, input output (I/O) means such as a network connection, mouse, keyboard, monitor, and the like (many of which are not shown for simplicity).

In one embodiment, storages 818A-818C may be representative of any type of mass storage device such as hard disk systems, optical media drives, tape drives, ram disk storage, and the like. As such, the program instructions comprising the design tools may be stored within any of storages 818A-818C and loaded into the local system memory of any of the workstations during execution. As an example, as shown in FIG. 8, the compiler/synthesis tool 811 is stored within storage 818A, while the RTL Reconfiguring tool, or DME (e.g. when the repartitioning tool is a standalone script(s) and or program suite) 813 is shown stored within storage 818B, the netlist 815 and the device library 817 are stored within storage 818C, and the RTL configuration file is also stored within storage 818A. Additionally, the program instructions may be stored on a portable/removable storage media. The program instructions may be executed directly from the removable media or transferred to the local system memory or mass storages 818 for subsequent execution. As such, the portable storage media, the local system memory, and the mass storages may be referred to as non-transitory computer readable storage mediums. The program instructions may be executed by the one or more processors on a given workstation, or they may be executed in a distributed fashion among the workstations, as desired.

It is noted that although the computer system shown in FIG. 8 is a networked computer system, it is contemplated that in other embodiments, each workstation may also include local mass storage. In such embodiments, the program instructions and the results of the design tools may be stored locally. Furthermore, it is contemplated that the program instructions may be executed on a standalone computer such as a personal computer that includes local mass storage and a system memory. Generally, the program instructions may be executed on any platform and/or hardware configuration conducive to storing and manipulating data and programming instructions. In some embodiments, application specific hardware modules may also be designed if desired, to implement any or all of the elements of the processes described herein, for which such implementation is possible.

Various embodiments described above provide examples of a method for manipulating an RTL code base, and automatically reconfiguring and repartitioning the RTL code base to obtain a functionally identical new RTL code base that synthesizes differently from the unmodified RTL code base. Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method comprising:
executing a design modification engine (DME) using one or more computers each comprising at least a processor and a memory, wherein executing the DME comprises:
receiving a Register Transfer Language (RTL) code base representative of an integrated circuit;
receiving a configuration file comprising transformation definitions and transformation commands defining where and how to transform existing code to modified code in the received RTL code base;
parsing the received RTL code base, and automatically identifying, according to the definitions contained in the configuration file, sections of code within the received RTL code base as the received RTL code base is parsed;
automatically transforming the identified sections of code according to the definitions contained in the configuration file, comprising rewriting the identified sections of code in a way that ensures that the transformed identified sections of code synthesize to desired circuit structures; and
outputting a modified RTL code base comprising the transformed identified sections of code, wherein the modified RTL code base and the received RTL code base are representative of identical functionality.

2. The method of claim 1, further comprising: executing a synthesis program comprising generating a netlist from the modified RTL code, wherein the netlist comprises the desired circuit structure.

3. The method of claim 1, wherein the desired circuit structures represent logic structures at a higher level of organization than AOI (AND-OR-Invert) logic gates.

4. The method of claim 1, wherein automatically transforming the identified sections of code comprises automatically repartitioning modules represented by the identified sections of code.

5. The method of claim 1, wherein automatically transforming the identified sections of code comprises automatically adding and/or removing ports represented by the identified sections of code.

6. The method of claim 1, wherein executing the DME further comprises incorporating the modified RTL code base into a high level system comprising additional RTL code.

7. A system comprising:
one or more processing units configured to execute programming instructions; and
one or more memory elements configured to store programming instructions executable by the one or more processing units to:
parse a first file containing an original Register Transfer Language (RTL) code representative of one or more functional circuit blocks;
automatically identify, according to information contained in a configuration file, specific sections of the original RTL code as the first file is parsed;
automatically rewrite the identified specific sections of the original RTL code according to transformation definitions contained in the configuration file in a way that ensures that the transformed identified specific sections of the original RTL code synthesize to desired circuit structures; and
output a second file containing a modified RTL code comprising the transformed identified specific sections of the original RTL code, wherein the modified RTL code and the original RTL code correspond to identical overall logic functionality.

8. The system of claim 7, wherein the one or more memory elements are further configured to store one or more of: the first file, the second file, and the configuration file.

9. The system of claim 7, wherein the one or more memory elements are further configured to store programming instructions executable by the one or more processing units to:
synthesize the modified RTL code to obtain a netlist corresponding to the modified RTL code implementing the identical logic functionality.

10. The system of claim 7, wherein the one or more memory elements are further configured to store programming instructions executable by the one or more processing units to:
perform a simulation on the modified RTL code to verify the identical logic functionality.

11. A non-transitory computer readable memory medium configured to store programming instructions executable to:
read one or more configuration files that include:
information identifying specific Register Transfer Language (RTL) code segments; and
transformation commands that define how to transform the specific RTL code segments;
parse an RTL file containing an original RTL code representative of one or more functional circuit blocks;
detect, according to the information contained in the one or more configuration files, the specific RTL code segments in the original RTL code as the RTL file is parsed;
automatically rewrite the detected specific RTL code segments in the original RTL code into modified RTL code segments in a way that ensures that the modified RTL code segments synthesize to desired circuit structures according to the transformation commands contained in the configuration file; and
generate a modified RTL file containing modified RTL code comprising the modified RTL code segments, wherein the modified RTL code and the original RTL code are both representative of the one or more functional circuit blocks.

12. The non-transitory computer readable memory medium of claim 11 further configured to store programming instructions executable to:
read the modified RTL file; and
synthesize a netlist based on the modified RTL file.

13. The non-transitory computer readable memory medium of claim 11 further configured to store programming instructions executable to:
read the modified RTL file; and
run simulations on the modified RTL file to test functionality of the one or more functional circuit blocks.

14. The non-transitory computer readable memory medium of claim 11, wherein the transformation commands specify one or more of:
definition of a location of RTL code;
identification and conversion of code structures;
addition and removal of ports;
merger of modules;
division of modules;
creation of new signal assignments;
addition of code comments;
removal of code comments; or
editing lines that match a regular expression.

* * * * *